A. R. SCHOENKY.
MACHINE FOR GROOVING LEATHER.
APPLICATION FILED JUNE 19, 1918.
1,296,859.
Patented Mar. 11, 1919.
2 SHEETS—SHEET 1.
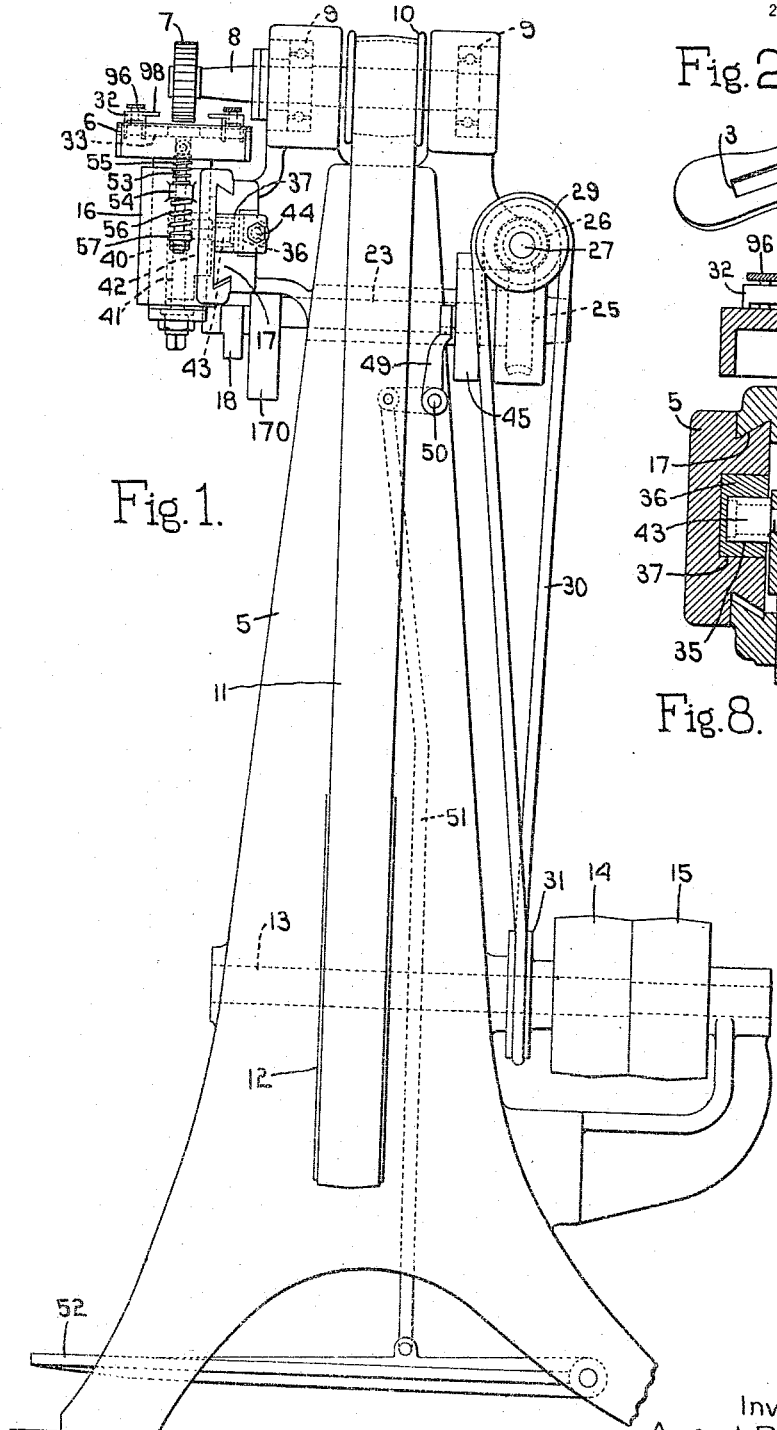
Fig. 1.
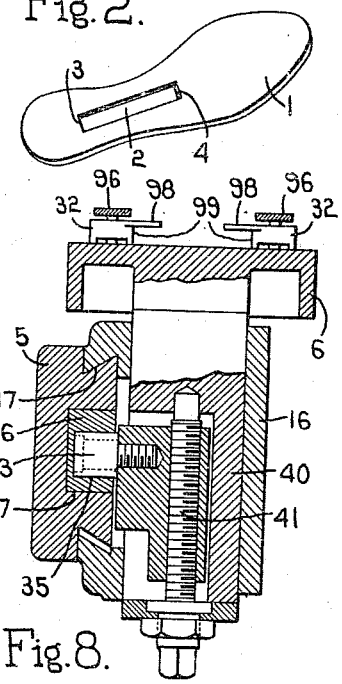
Fig. 2.
Fig. 8.
Inventor.
August R. Schoenky
by Heard Smith + Tennant.
Attys.

A. R. SCHOENKY.
MACHINE FOR GROOVING LEATHER.
APPLICATION FILED JUNE 19, 1918.
1,296,859.
Patented Mar. 11, 1919.
2 SHEETS—SHEET 2.
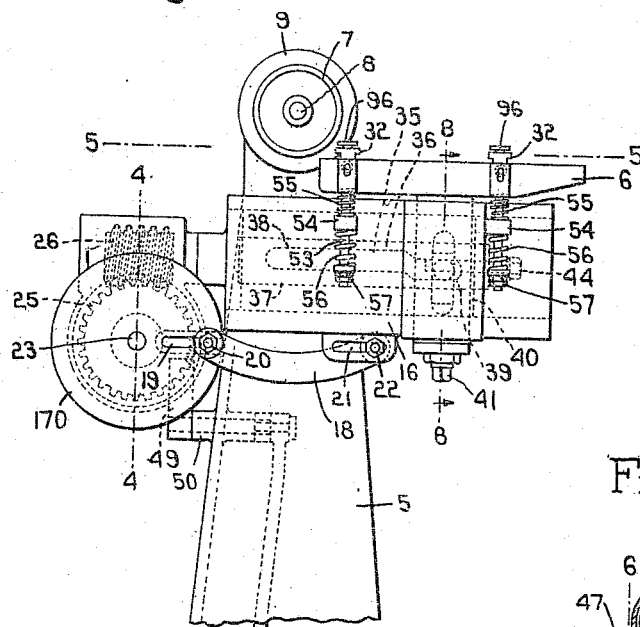
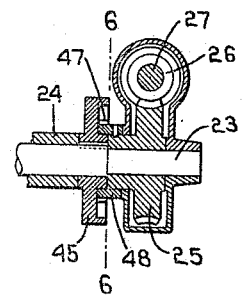
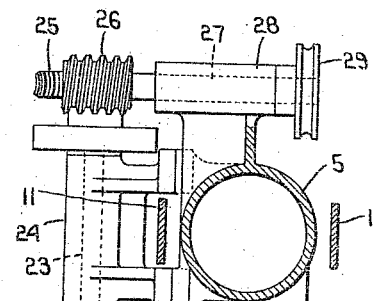
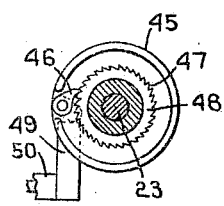
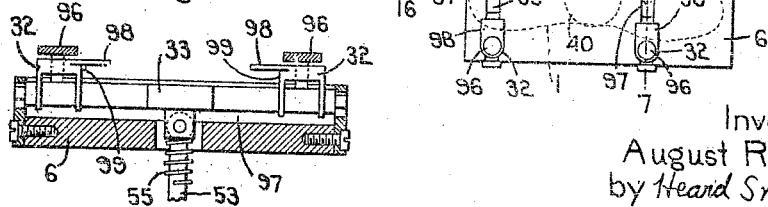
Inventor.
August R. Schoenky
by Heard Smith + Tennant
Attys.

UNITED STATES PATENT OFFICE.

AUGUST R. SCHOENKY, OF SOMERVILLE, MASSACHUSETTS, ASSIGNOR TO REECE SHOE MACHINERY COMPANY, OF BOSTON, MASSACHUSETTS, A CORPORATION OF MAINE.

MACHINE FOR GROOVING LEATHER.

1,296,859.        Specification of Letters Patent.        Patented Mar. 11, 1919.

Application filed June 19, 1918. Serial No. 245,830.

*To all whom it may concern:*

Be it known that I, AUGUST R. SCHOENKY, a citizen of the United States, residing at Somerville, county of Middlesex, State of Massachusetts, have invented an Improvement in Machines for Grooving Leather, of which the following description, in connection with the accompanying drawing, is a specification, like characters on the drawing representing like parts.

This invention relates to a machine for forming a groove in the face of a piece of leather or other material and is particularly designed for use in forming in the surface of a shoe sole a groove to receive a shank stiffener.

In the manufacture of shoes it is customary to employ a metal shank stiffener which is associated with the sole at the shank of the shoe, and the purpose of which is to give strength and stiffness to the shoe shank. Sometimes the sole is provided with a groove in which such metal shank stiffener is received, and the machine herein illustrated is especially designed to provide a groove of this nature. The device comprises a work support on which the sole is received, a rotatable grooving tool which is adapted to cut the required groove in the face of the sole, means to move the work support horizontally beneath said tool, and means to give the work support a movement toward and from the tool during its horizontal movement. The horizontal movement of the work support carries the shoe sole back and forth beneath the grooving tool and the vertical movement of the work support brings the shoe sole into engagement with the grooving tool so as to begin the cutting of the groove, and maintains it in engagement for a sufficient time to permit a groove of the proper length to be cut. The mechanism for reciprocating the work support and for moving it vertically are both adjustable so as to provide for cutting grooves of different lengths and of different depths.

In order to give an understanding of the invention, I have illustrated in the drawings a selected embodiment thereof which will now be described, after which the novel features will be pointed out in the appended claims.

Figure 1 is an elevation of a machine embodying my invention;

Fig. 2 is a perspective view of a sole showing the groove cut therein for receiving the shank stiffener;

Fig. 3 is a front view of the head of the machine;

Fig. 4 is a section on the line 4—4, Fig. 3;
Fig. 5 is a section on the line 5—5, Fig. 3;
Fig. 6 is a section on the line 6—6, Fig. 4;
Fig. 7 is an enlarged section on the line 7—7, Fig. 5;
Fig. 8 is an enlarged section on the line 8—8, Fig. 3.

As stated above, the machine herein illustrated has been designed for cutting a groove in a shoe sole to receive the shank stiffener.

In Fig. 2 I have illustrated a shoe sole at 1 which is provided with a groove 2 therein at the shank portion thereof, this groove being designed to receive a metal shank stiffener. The groove is situated at the shank portion of the sole, one end 3 of the groove terminating adjacent the heel portion of the sole and the other end 4 of the groove terminating just back of the ball portion of the sole.

The machine herein shown comprises a stand or frame 5 on which is supported a work support or work-receiving table 6 adapted to receive the shoe sole 1 and a rotary grooving tool 7 situated above the work support and adapted to act on the shoe sole to cut the groove 2 therein. The work support is reciprocated underneath the tool 7 as the latter rotates in the direction of the length of the groove so that during the reciprocation of the work support the tool 7 will operate to cut the groove 2 in the shoe sole.

The cutting tool 7 is mounted on a shaft 8 that is journaled in suitable bearings 9 carried by the stand 5, said shaft having a pulley 10 thereon over which operates a driving belt 11 that is driven from a driving pulley 12 on a driving shaft 13. This driving shaft 13 may be driven from any suitable source of power and I have herein shown it as provided with the fast pulley 14 and the loose pulley 15 with which a power belt coöperates. The work support 6 is sustained in a carriage 16 which is slidable back and forth on ways 17 formed on the frame 5, the reciprocating movement of the carriage 16 operating to move the work support back and forth beneath the tool 7. The carriage may be reciprocated by any suitable means. I have herein illustrated it as being actuated from a crank disk 170 by means of a link 18 which connects the crank disk to the slide. The link will preferably be adjustably connected both to the crank disk and to the carriage so that both the length of the reciprocating movement of the carriage and the position of the carriage relative to the tool may be adjusted. The crank disk is shown as having a slot 19 therein into which one end of the link 18 is adjustably secured by means of a clamping bolt 20, and the carriage is provided with a slot 21 in which is received a clamping bolt 22 carried by the other end of the link 18. By adjusting the link in the slot 19 the throw of the crank disk will be regulated and by adjusting the link in the slot 21, the position of the carriage relative to the tool 7 may be adjusted. The crank disk 170 is shown as mounted on a shaft 23 which is journaled in suitable bearings 24 carried by the frame and which is provided with a worm gear 25 that meshes with and is driven by a worm 26 on a shaft 27 that is journaled in suitable bearings 28 carried by the frame. The shaft 27 has a pulley 29 thereon over which operates a belt 30 that extends around a pulley 31 on the driving shaft 13. The carriage 16 thus derives its reciprocating movement from the driving shaft 13.

In practice I propose to give the carriage 16 a reciprocating movement longer than the length of the groove to be cut so that when the carriage is at one end of its stroke, the work support will be in a position sufficiently beyond the grooving tool to permit a shoe sole to be readily placed in position, as shown in Fig. 3. The movement of the carriage toward the left, Fig. 3, will carry the shoe sole beneath the grooving tool, and when the shoe sole is in a position where the end 3 of the groove is underneath the tool the work support 6 is raised to bring the shoe sole into engagement with the tool thereby causing the tool to cut into the surface of the sole. The continued movement of the work support to the left will result in cutting a groove to the desired length. When the work support reaches the end of its movement to the left it will return to the position shown in Fig. 3 and during the return movement the work support is lowered when the tool reaches the end 3 of the groove.

For thus raising and lowering the work support, I have provided a cam which acts thereon during the movement of the carriage. This cam is shown as a cam groove 35 formed in a cam member 36 that is set into a groove 37 formed in the ways 17. The cam groove is provided with the high portion 38 at one end and the low portion 39 at the other end.

The work support 6 is provided with a stem 40 which extends down through the carriage 16, and said stem supports an adjusting screw 41 which screw-threads through a block 42 having a projection 43 extending therefrom which operates in the cam groove 35. The adjusting screw 41 provides for adjusting the block vertically relative to the stem 40 and thereby provides for adjusting the work support 6 relative to the slide 16. When the set screw 41 has been properly adjusted the block 42 is rigid with the stem, and as the carriage moves back and forth the projection 43 will travel in the cam groove 35. When the parts are in the position shown in Fig. 3, the projection 43 is in the low portion 39 of the cam groove and the work support is in its lowered position. As the slide moves toward the left Fig. 3 and the projection 43 passes from the low to the high portion of the cam groove the work support will be raised, thus bringing the work into engagement with the cutting tool.

The cam member 36 is preferably adjustable longitudinally of the groove 37 by means of the adjusting screw 44 and, therefore, the cam groove can be adjusted so as to cause the work support to have its rising movement at any point in its travel.

The work support 6 is provided with work clamps for clamping the work in place during the groove-forming operation, and the construction herein shown is one by which the work clamps will be operated automatically to clamp the work when the cutting of the groove begins and to unclamp the work after the groove has been completed. Further, said work clamps act also as edge guides for properly positioning the sole. The work-clamping device comprises a plurality of pairs of clamping members 32, each provided with an overhanging lip 98 adapted to overlie the sole and also provided with an edge 99 adapted to engage the edge of the sole and thereby position the latter. Each pair of clamps 32 are adjustably mounted on a bar 33 that extends transversely of the work support 6 and operates in a groove 97 therein. The clamps can be adjustable longitudinally of the bar 33 in order to fit soles of different sizes and they are held in their adjustable position by clamp screws 96. When they are properly positioned a sole can be inserted beneath the lips 98, as indicated in dotted lines Fig. 5, and the combined clamping members and edge gage then serve to hold the sole in proper position.

Each bar 33 has a stem 53 depending therefrom which extends through the work support and also through a boss or ear 54 on the carriage 16. Each stem 53 has a clamp-lifting spring 55 encircling the same and situated between the bar 33 and the boss 54, said spring acting normally to hold the work clamps raised sufficiently above the surface of the table 6 to permit a sole to be inserted beneath the clamps. Each stem 53 is also provided with a cushion spring 56 which is situated between the boss 54 and a collar or nut 57 on the lower end of the stem. The cushion springs 56 and clamp-lifting springs 55 are so adjusted that when the work table 6 is in its lowered position the springs 56 will be under no tension and the springs 55 will hold the work clamps raised. When the work table moves to the right Fig. 3 and is lifted by the projection 43 passing into the high portion 38 of the cam, such upward movement of the work table will move the latter toward the work clamps and thus cause the sole to be firmly clamped between the work clamps and the work table. The cushion springs 56 allow a yielding movement to the work clamps during the clamping action thereby to compensate for any variations in the thickness of the sole or other material being clamped. When the work table moves back into the position shown in Fig. 3 and is lowered the work clamps will be automatically lifted to release the work by the action of the springs 55.

I will preferably provide means whereby when the machine is set in operation the carriage 16 will make one forward and backward reciprocation and then will be brought to rest so that in operating the machine the operator may place a sole on the work support, set the machine in operation thereby causing the carriage to move to the limit of its extent to the left, and then to return to the position shown in Fig. 3, at which time the machine will be brought to rest, thus enabling the operator to remove the grooved sole and place an ungrooved sole on the work support. Any suitable stop device may be employed to bring the machine to rest after each cycle of operations. I have herein shown the worm gear 25 as connected to the shaft 23 by a one-revolution clutch device comprising a collar 45 fast on the shaft 23 and having a spring-pressed clutch-dog 46 pivoted thereto which is adapted to engage teeth 47 formed on a collar 48 that is rigid with the gear 25. 49 indicates a clutch-disengaging member pivoted to the frame at 50 and connected by a link 51 to a treadle 52. When the machine is at rest the clutch-disengaging member 49 engages the tail of the dog 46 and holds it out of engagement with the teeth 47, thus permitting the gear 25 to rotate freely without giving rotation to the shaft 23. When the treadle 52 is depressed the member 49 is withdrawn from the tail of the clutch dog 46, thus allowing it to come into engagement with the teeth 47. The gear 25 is thus coupled to the shaft, and the shaft 23 will rotate. If the treadle is released as soon as the shaft has started to rotate, then when the shaft completes its rotation and the work support is brought into the position shown in Fig. 3, the tail of the clutch dog will engage the member 49, thus disengaging the clutch dog from the teeth 47.

I claim:

1. In a machine for grooving leather and similar material, the combination with a work support, of a rotatable grooving tool, means to move the work support beneath the tool, and means for automatically raising and lowering the work support as it moves beneath the tool.

2. In a machine for grooving leather or similar material, the combination with a rotatable grooving tool, of a work support, means to reciprocate the work support beneath the tool in the direction in which the groove is to be cut, and means operative to move the work support toward the tool during its reciprocation in one direction and away from the tool during its reciprocation in the other direction.

3. In a machine for grooving leather or similar material, the combination with a work support, of a rotatable grooving tool above the work support, means to reciprocate the work support beneath the tool in a direction at right angles to the axis of rotation of said tool, and means operative automatically to move the work support toward and from the tool during its reciprocation.

4. In a machine for grooving leather and similar material, the combination with a work support, of a rotatable grooving tool situated above the work support, a reciprocating carriage on which the work support is mounted, and a cam device for raising and lowering the work support on the carriage as the latter reciprocates.

5. In a machine of the class described, the combination with a rotatable grooving tool, of a work support, a reciprocating carriage on which the work support is mounted, said work support having a projection adjustably sustained thereby, and a cam member having a cam groove in which said projection operates and by which the work support is moved toward and from the grooving tool as the carriage reciprocates.

6. In a machine for grooving leather and similar material, the combination with a work support, of a rotatable grooving tool, means to move the work support beneath said tool, means to raise and lower the work support as it moves beneath the tool, and automatic means for clamping the work to and unclamping it from said work support as the latter is raised and lowered.

7. In a machine for grooving leather and similar material, the combination with a work support, of a rotatable grooving tool, means to move the work support beneath said tool, means to raise and lower the work support as it moves beneath the tool, and means to clamp the work to the work support by the rising movement of the latter and to unclamp it by the lowering movement thereof.

8. In a machine for grooving leather and similar material, the combination with a work support, of a rotatable grooving tool, means to move the work support beneath said tool, means to raise and lower the work support as it moves beneath the tool, work-clamping members, and means to cause said members to clamp the work against the work support when the latter is raised.

9. In a machine for grooving leather or similar material, the combination with a rotatable grooving tool, of a work support, means to reciprocate the work support beneath the tool in the direction in which the groove is to be cut, means to move the work support toward and from the tool during its reciprocation, and automatic means to bring the machine to rest at the end of such to-and-fro movement of the work support.

10. In a machine for grooving leather and similar material, the combination with a work support, of a rotatable grooving tool, means to move the work support beneath said tool, means to raise and lower the work support as it moves beneath the tool, a plurality of combined work-clamping members and edge gages, and means to cause said members to clamp the work against the work support when the latter is raised and to release the work when the work support is lowered.

11. In a machine for grooving leather and similar material, the combination with a work support, of a rotatable grooving tool, means to move the work support beneath said tool, means to raise and lower the work support as it moves beneath the tool, a plurality of combined work-clamping members and edge gages adjustable transversely of the work support, and means to cause said members to clamp and unclamp the work as the work support is raised and lowered.

12. In a machine for grooving leather and similar material, the combination with a work support, of a rotatable grooving tool, means to reciprocate the work support beneath the tool, and means operative during the reciprocation of the work-support in one direction to cause it to move toward the tool and during its reciprocation in the opposite direction to cause it to move away from the tool.

13. In a machine for grooving leather or similar material, the combination with a work support, of a rotatable grooving tool, means to move the work support beneath the tool, and means operative automatically during the movement of the work support to cause the latter to move toward the tool.

14. In a machine for grooving leather or similar material, the combination with a work support, of a rotatable grooving tool, means to move the work support beneath the tool, and means operative at a point between the limits of movement of the work support to cause it to move toward the tool.

In testimony whereof I have signed my name to this specification.

AUGUST R. SCHOENKY.

Copies of this patent may be obtained for five cents each, by addressing the "Commissioner of Patents, Washington, D. C."